United States Patent [19]

Shirai et al.

[11] Patent Number: 5,345,329
[45] Date of Patent: Sep. 6, 1994

[54] POLARIZATION-INDEPENDENT OPTICAL ISOLATOR

[75] Inventors: Kazushi Shirai; Toshihiko Takano; Norio Takeda; Mitsuzo Arii, all of Tokyo, Japan

[73] Assignee: Mitsubishi Gas Chemical Company, Inc., Tokyo, Japan

[21] Appl. No.: 62,552

[22] Filed: May 18, 1993

[30] Foreign Application Priority Data

Jun. 19, 1992 [JP] Japan .................................. 4-161181

[51] Int. Cl.$^5$ .......................... G02B 5/30; G02B 27/28; G02F 1/09
[52] U.S. Cl. ..................................... 359/282; 359/283; 359/484; 359/494; 359/497; 372/703
[58] Field of Search ............... 359/280, 281, 282, 283, 359/484, 490, 494, 495, 497, 499; 372/703

[56] References Cited

U.S. PATENT DOCUMENTS 4,609,257   9/1986   Shirasaki .............................. 359/283

FOREIGN PATENT DOCUMENTS

| 0352002 | 1/1990 | European Pat. Off. . | |
|---|---|---|---|
| 58-28561 | 6/1983 | Japan . | |
| 0044021 | 3/1984 | Japan .................................. | 359/484 |
| 60-49297 | 11/1985 | Japan . | |
| 60-51690 | 11/1985 | Japan . | |
| 61-58809 | 12/1986 | Japan . | |
| 0272419 | 11/1990 | Japan .................................. | 372/703 |
| 477713 | 3/1992 | Japan . | |
| 4-102821 | 4/1992 | Japan .................................. | 372/703 |

OTHER PUBLICATIONS

Institute of Electronics, Information and Communication Engineers of Japan, 1992, '91 spring National Conference c-290, Research Institute of Electrocal Communication, Tohoku Univ.

Primary Examiner—Ricky D. Shafer
Attorney, Agent, or Firm—Sughrue, Mion, Zinn, Macpeak & Seas

[57] ABSTRACT

An optical isolator comprises two birefringent plates one of which separates two light components whose planes of polarization are perpendicular to each other to make the two light components spatially separate between the two birefringent plates and pass through two separate optical paths and the other of which thereafter combines the two separate light components, two Faraday rotators disposed between the two birefringent plates and having a Faraday rotation angle of approximately 45 degrees, a polarizer disposed between the two Faraday rotators and having a predetermined polarized-light transmitting angle, and a magnetic field device for applying an external magnetic field to the two separate optical paths in the two Faraday rotators to magnetize respective regions near the two optical paths in each of the rotators in opposite magnetization directions to each other. In this arrangement two light components entering the polarizer in the forward direction has the same angle of plane of polarization as the predetermined polarized-light transmitting angle of the polarizer so as to pass through the polarizer, but two light components entering the polarizer in the reverse direction has an angle of plane of polarization perpendicular to the predetermined polarized-light transmitting angle of the polarizer so as not to pass through the polarizer. The high performance polarization-independent optical isolator may be obtained with high isolation of more than 50 dB, which is easy in assembling or manufacturing.

6 Claims, 8 Drawing Sheets

MAGNETIC LINES OF FORCE

MAGNETIC LINES OF FORCE

POLARIZATION-INDEPENDENT OPTICAL ISOLATOR

BACKGROUND OF THE INVENTION

1. Field of the Invention

The present invention relates to an optical isolator independent of polarization direction which is set between optical fibers in an application. More particularly, the invention relates to a polarization-independent optical isolator independent of polarization with high isolation, which is very easy in assembling and adjustment.

2. Description of the Related Art

The semiconductor laser is conveniently used as a coherent light source for optical application instruments or for optical communication devices. The semiconductor laser, however, has a serious defect or problem in that the laser creation becomes unstable if a ray emitted from the semiconductor laser source is reflected by an optical system, for example by an end plane of a connector or the like, so as to reflect back into the semiconductor laser source.

In order to solve this problem of the semiconductor laser, that is, to prevent the reflected light from returning into the semiconductor laser source, an optical isolator is provided in an optical path on the light output side of the source. The optical isolator used for that purpose is an optical device (as shown in FIG. 1) having a Faraday rotator for separating the reflected ray from rays emitted from the semiconductor laser source by the Faraday effect.

The conventional optical isolator is normally comprised of a polarizer, a magneto-optical element (Faraday rotator), an analyzer, and permanent magnets as shown in FIG. 1. In more detail, reference numeral 1 denotes a polarizer made for example of Polacore available from Corning Co., Inc. in FIG. 1. Numeral 2 designates a magneto-optical element (Faraday rotator) made for example of a bismuth-substituted magnetic garnet single crystal, numeral 3 an analyzer made for example of Polacore from Corning Co., Inc., and numeral 4 permanent magnets for example of Sm-Co (samarium-cobalt). FIG. 2 shows polarization directions of light a propagating in the forward direction and of light b propagating in the reverse direction in the optical isolator arranged as shown in FIG. 1. In FIG. 1 numerals ①, ②, ③, and ④ represent the respective spatial positions as shown in FIG. 1. The forward light a emitted from the semiconductor laser source is linearly polarized by the polarizer 1 to have the vertical plane of vibration, and the linearly polarized light then enters the Faraday rotator 2. The light incident into the Faraday rotator 2 is subject to rotation of plane of polarization by the Faraday effect. The direction of rotation of polarization plane differs depending upon the orientation of magnets or upon the kind of material of the Faraday rotator, so that it cannot be uniquely determined. Then, the present application employs the following conditions. The plane of polarization is rotated right by 45 degrees as seen from the semiconductor laser source side (from the left in FIG. 1). As described herein, clockwise rotation is designated as right rotation, while counterclockwise rotation is designated as left rotation, as viewed from the left, that is, from the semiconductor laser source side (light emission side) for brevity and clarification of description, unless stated otherwise.

The light input into and then output from the Faraday rotator 2 enters the analyzer 3. The transmission direction of the analyzer 3 is made coincident with the polarization plane of the light having passed through the Faraday rotator 2, so that the analyzer 3 transmits the light without interruption. Accordingly, the forward light a emitted from the semiconductor laser source passes through the optical isolator without any loss except for slight absorption and Fresnel reflection in the respective elements, i.e., the polarizer 1, the Faraday rotator 2, and the analyzer 3.

On the other hand, the reverse light b, that is, reflected light of semiconductor laser returning to the semiconductor laser source (reflection return light), passes through the analyzer 3 and then enters the Faraday rotator 2. The plane of polarization of the reverse light b incident into the Faraday rotator 2 is rotated by 45 degrees in the same manner as that of the forward light a. Since the Faraday rotator has an intrinsic effect to rotate incident light always in the same direction irrespective of a traveling direction of light, the polarization plane of the reverse light b is thus rotated right. Consequently, the polarization direction of the reverse light b having passed through the Faraday rotator 2 makes an angle of 90 degrees with the polarization direction of the forward light a. Therefore, the reverse light b, having passed through the Faraday rotator 2, that is, the reflected light (reflection return light) returning toward the semiconductor laser source, is interrupted by the polarizer 1, and cannot reach the semiconductor laser source.

In summary, the optical isolator transmits light incident from the semiconductor laser source (from the left in FIG. 1), for example laser output light without interruption, but interrupts light incident from the opposite side (from the right side in FIG. 1), for example the reflection return light.

The above description concerning the function of optical isolator is based on the example in which the polarizer 1 and the analyzer 3 are dichroic polarizers, for example Polacore (trade name) manufactured by Corning Co., Inc. Supposing the polarizer and the analyzer are birefringent plates made for example of a futile single crystal, the substantially same function and effect can be attained. It does not matter at all which material is used for the polarizer and the analyzer from the viewpoint of practical function accordingly. Daring to describe a difference, the reverse light b (reflection return light) is interrupted as absorbed by the polarizer 1 in case of dichroic polarizer as described. Whereas in the case of a birefringent plate the optical path of the reverse light b (reflection return light) is oblique in the birefringent plate to be deviated after transmission therethrough, so that the reverse light leaves the birefringent plate at a different position deviated from the incidence position of the forward light a, whereby the reverse light may be prevented from returning to the semiconductor laser source or semiconductor laser output point. There is no difference in function and operational effect as to the polarizer and the analyzer between the two materials, specifically in that the reverse light b (reflection return light) is stopped from returning to the semiconductor laser source or semiconductor laser output point, but there is only a difference in mechanism of occurrence of the operational effect.

The emission light of a semiconductor laser is almost linearly polarized. Consequently, the optical isolator can transmit the emission light emitted from the semiconductor laser source with little loss, if the polarization direction of the laser light is made coincident with the polarized light transmission direction of the polarizer. In contrast, if the optical isolator arranged as shown in FIG. 1 is inserted between optical fibers in which light is propagating in a non-polarized state, light with plane of polarization not coinciding with the polarized light transmission direction of the polarizer in the light propagating in the optical fiber is stopped or interrupted by the polarizer 1, and therefore cannot pass through the polarizer 1. It has been found that an amount of light stopped or interrupted by the polarizer (an amount of optical loss), reached about 3 dB. This optical loss amount can be said to be a very serious technical problem in practical use of semiconductor laser.

To solve this problem, a polarization-independent optical isolator independent of polarization is proposed as an optical isolator which permits all polarization components to pass therethrough in the forward direction. For example, Matsui et al. or Matsumoto proposed an apparatus with three birefringent plates incorporated therein (Japanese Patent Publication (Kokoku) No. 60-51690 (see FIG. 3); Japanese Patent Publication (Kokoku) No. 58-28561). Additionally, Uchida et al. proposed an apparatus with a combination of two birefringent plates with an optical rotatory element (Japanese Patent Publication (Kokoku) No. 60-49297). Further, Shirasaki proposed an apparatus using a tapered birefringent plate and a lens (Japanese Patent Publication (Kokoku) No. 61-58809).

The polarization-independent optical isolator proposed by Matsui et al. has the basic structure as shown in FIG. 3. In FIG. 3, reference numeral 5 designates a first birefringent plate obtained by cutting out of a uniaxial crystal such as rutile single crystal a parallel plate with the optical axis thereof being inclined to the surfaces. Numeral 6 denotes a Faraday rotator made of a bismuth-substituted magnetic garnet single crystal having a Faraday rotation angle of 45 degrees. Numeral 7 represents a second birefringent plate having the same inclination angle between the optical axis and the surfaces as the first birefringent plate 5, which is arranged such that the optical axis thereof is inclined by 45 degrees right from the first birefringent plate 5 about the incident ray a. Numeral 8 represents a third birefringent plate having the same inclination angle between the optical axis and the surfaces as the first birefringent plate 5, which is arranged such that the optical axis thereof is inclined by 45 degrees left from the first birefringent plate 5 about the incident ray a. Further, numeral 9 denotes a permanent magnet for magnetically saturating the Faraday rotator. FIG. 4 shows positions and polarization directions of light at each exit plane of the first birefringent plate 5, the Faraday rotator 6, the second birefringent plate 7, or the third birefringent plate 8, and the directions of optical axis of the birefringent plates.

The first birefringent plate 5 separates the incident light a traveling in the forward direction in the polarization-independent optical isolator arranged as shown in FIG. 3, into two rays, i.e., an ordinary ray and an extraordinary ray having respective vibration planes perpendicular to each other. The ordinary ray travels straight through the first birefringent plate 5. The extraordinary ray travels obliquely through the first birefringent plate 5. After passing through the first birefringent plate 5, the ordinary ray and the extraordinary ray propagate in parallel with each other and enter the Faraday rotator 6. The Faraday rotator 6 then rotates their polarization planes right by 45 degrees to transmit them. The ordinary ray and the extraordinary ray, having passed through the magneto-optical element 6, enter the second birefringent plate 7. The second birefringent plate 7 is set with its optical axis inclined at an angle of 45 degrees with respect to the optical axis of the first birefringent plate 5. Thus, only a polarization component in parallel with the optical axis of the second birefringent plate 7 can obliquely travel to pass through the crystal of the second birefringent plate 7. The light leaving the second birefringent plate 7 then enters the third birefringent plate 8. The third birefringent plate 8 is set with its optical axis inclined at angle of 90 degrees with respect to the optical axis of the second birefringent plate 7. Thus, only a polarization component in parallel with the optical axis of the third birefringent plate 8 can obliquely travel to pass through the crystal of the third birefringent plate. Supposing the thickness of each of the second birefringent plate 7 and the third birefringent plate 8 is $1/\sqrt{2}$ of the thickness of the first birefringent plate 5, the two rays separated by the first birefringent plate 5 would be again combined into a single beam.

On the other hand, the reverse light b travels to pass backward through the third birefringent plate 8 and the second birefringent plate 7 in the same optical paths as the forward light a, and then enters the Faraday rotator 6 (see FIG. 5). The polarization direction of the reverse light b leaving the Faraday rotator 6 is perpendicular to the polarization direction of the forward light a, because the polarization direction of the reverse light b is rotated right by 45 degrees by the Faraday rotator. Then, the reverse light b leaves the first birefringent plate 5 at positions different from the incident position of the forward ray a. In the method using the polarization-independent optical isolator, non-polarized light a incident from the left, for example semiconductor laser light, may be perfectly separated from non-polarized light b incident from the right, that is, from the other side of the isolator.

Rapid progress lately seen in light direct amplification technology is indispensable for development of optical fiber communications, for example in light amplifying technology with erbium-doped optical fiber. The light direct amplification technology with erbium-doped optical fiber is an epoch-making technology in which when light for excitation and signal light of 1.55 $\mu$m band are guided through the erbium-doped optical fiber. The signal light of 1.55 $\mu$m band is amplified by several orders by the excitation light during transmission through the erbium-doped optical fiber.

The erbium-doped optical fiber amplifier has a serious technical problem in that the signal amplification becomes unstable if light is reflected (for example by an end plane of an optical fiber connector) returns to the amplifier. Therefore, in order to stabilize the erbium-doped optical fiber amplifier, the optical isolator must be set at either end of the erbium-doped optical fiber to eliminate the reflection return light (*Journal of Institute of Electronics, Information and Communication Engineers of Japan*, Vol. 74 No. 3, pp 221–224, 1991). For the purpose of setting, the optical isolator disposed at either end of the erbium-doped optical fiber must have a function to transmit the forward light with little loss but to almost completely interrupt the reflection return light, while non-polarized light propagates in the optical fiber. That is, the optical isolator must be a polarization-independent optical isolator. The light direct amplifier with erbium-doped optical fiber is heavily affected in stability of amplification be even slight reflection return light, and, therefore, the polarization-independent optical isolator used therein is expected to have isolation of 50 dB or more.

There have been various polarization-independent optical isolators proposed (e.g., Japanese Patent Publication (Kokoku) No. 80-51690, Japanese Patent Publication (Kokoku) No. 58-28561, Japanese Patent Publication (Kokoku) No. 80-49297, and Japanese Patent Publication (Kokoku) No. 61-58809). It is known that the upper limit of isolation of polarization-independent optical isolator is generally determined by the extinction ratio of Faraday rotator. The polarization-independent optical isolators proposed in the above patent publications have an upper limit of isolation of about 40 dB from description in the specifications thereof. The isolation of polarization-independent optical isolator would decrease to a large extent with variations of operating ambient temperature or with wavelength variations of semiconductor laser used as a light source due to the temperature dependence and the wavelength dependence of Faraday rotation angle of Faraday rotator.

Kok Wai Chang proposed the construction of FIG. 6 as a polarization-independent optical isolator having high isolation (European Patent No. 352002). In FIG. 6, reference numerals 10, 11, 12 are a first birefringent plate, a second birefringent plate, and a third birefringent plate, respectively, each of which is cut from a uniaxial crystal such as rutile single crystal with its optical axis inclined to the surfaces. Numerals 13, 14 denote a first Faraday rotator and a second Faraday rotator, respectively, made of bismuth-substituted magnetic garnet single crystal having a Faraday rotation angle of about 45 degrees.

FIG. 7 shows positions and polarization directions of light at an end plate of each of birefringent plates and Faraday rotators in case of a forward ray passing through the thus proposed polarization-independent optical isolator. In detail, forward light 40 incident into the first birefringent plate 10 is separated by the first birefringent plate 10 into a component 40a the polarization direction of which is parallel to the optical axis and a component 40b the polarization direction of which is perpendicular to the optical axis. The ray 40a and the ray 40b entering the first Faraday rotator 13, precisely the planes of polarization thereof, are rotated left by 45 degrees. The ray 40a with the polarization direction parallel to the optical axis of the second birefringent plate obliquely travels through the second birefringent plate 11 to become a ray 40a'. Then, the second Faraday rotator 14 rotates the planes of polarization of the ray 40a' and the ray 40b further left by 45 degrees. As a result, the polarization plane of ray 40a' becomes parallel to the optical axis of the third birefringent plate 12. On the other hand, the polarization plane of ray 40b becomes perpendicular to the optical axis of the third birefringent plate 3. Consequently, the ray 40a' and the ray 40b are combined with each other to become a ray 40' after they pass through the third birefringent plate 12.

FIG. 8 shows positions and polarization directions of light at an end plane of each of birefringent plates and Faraday rotators in case of a reverse ray in the polarization-independent optical isolator. The reverse ray 50 incident into the third birefringent plate 12 is separated thereby into a component 50a the polarization direction of which is parallel to the optical axis and a component 50b the polarization direction of which is perpendicular to the optical axis. The ray 50a and the ray 50b entering the second Faraday rotator 14, precisely the planes of polarization thereof, are rotated left by 45 degrees. Consequently, the ray 50a passing through the second birefringent plate 11 is output from the same position as the incident position, but the ray 50b obliquely travels through the second birefringent plate 11.

Provided that the Faraday rotation angle of the second Faraday rotator 14 is deviated by $df_1$ degrees from the 45-degree standard angle, each of the ray 50a and the ray 50b would contain a component, the polarization direction of which is perpendicular to the plane of polarization, with intensity of $\sin^2(df_1)$, that is, a component 50a' or a component 50b'.

The first Faraday rotator 13 rotates the ray 50a, the ray 50b, the ray 50a', and the ray 50b' left by about 45 degrees. The ray 50b and the ray 50a' passing through the first birefringent plate 10 are output from the same positions as the incident positions thereof, but the ray 50a and the ray 50b' obliquely travel through the first birefringent plate 10. Then, the ray 50a and the ray 50b' leave the first birefringent plate 10 at respective positions different from the incident positions of forward light.

Provided that the Faraday rotation angle of the first Faraday rotator 13 is deviated by $df_2$ degrees from the 45-degree standard angle, the ray 50a' would contain a component 50a'' perpendicular to the plane of polarization of the ray 50a' with intensity of $\sin^2(df_2)\cdot\sin^2(df_1)$, and the ray 50b' would contain a component 50b'' perpendicular to the plane of polarization of the ray 50b' with intensity of $\sin^2(df_2)\cdot\sin^2(df_1)$. These components are output from the incident light position of forward light after passing through the first birefringent plate 10.

Assuming the optical losses in the respective polarizers and Faraday rotators could be ignored, the theoretical isolation of the optical isolator arranged as shown in FIG. 6 may be calculated as follows:

$$-10 \times \log[\sin^2(df_2)\cdot\sin^2(df_1)].$$

A magneto-optical element currently commercially available normally has a deviation of rotation angle of about one degree. Assuming a deviation of rotation angle of each magneto-optical element is one degree ($df_1=1$, $df_2=1$), the theoretical isolation is calculated as 70 dB from the above equation, and, therefore, a very high value may be expected.

The polarization-independent optical isolator has another big problem (technical difficulty) of polarization dispersion to be solved for application. The polarization dispersion is a delay of passing time existing between two rays separated from forward light signal by the first birefringent plate 10, which is caused by a difference of optical path length between the separation and the recombination by the third birefringent plate 12. It is impossible to nullify the delay of passing time caused when the forward light signal passes through the optical isolator, because of the structure of the polarization-independent optical isolator. The polarization dispersion caused decreases the density of light signal and the propagation velocity. In order to make high speed light communications practically available, it is essential to immediately develop a high performance polarization-independent optical isolator with less polarization dispersion.

Shiraishi et al. proposed a high isolation polarization-independent optical isolator with less polarization dispersion as shown in FIG. 9 ('91 Spring National Conference c-290, Institute of Electronics, Information and Communication Engineers of Japan). In FIG. 9 numeral 15 and numeral 16 denote birefringent plates made of the futile single crystal. Numeral 17 and numeral 18 are half wave plates made of quartz. Numeral 19 and numeral 20 are polarization-dependent optical isolators.

In FIG. 9, forward light a is separated by the first birefringent plate 15 into an ordinary ray and an extraordinary ray. An optical path of the ordinary ray is denoted by c and an optical path of the extraordinary ray by d. The half wave plate 17 inserted into the optical path d of the extraordinary ray rotates the polarization direction of the extraordinary ray by 90 degrees, so that the polarization direction of the extraordinary ray is the same direction as that of the ordinary ray. Thus, the light traveling in the optical path c and the light traveling in the optical path d may pass through the polarization-dependent optical isolator 19 and the polarization-dependent optical isolator 20. The polarization planes of two rays either before incidence into the optical isolator 19 or after leaving the optical isolator 20 can be set in the same direction by suitably selecting to combine the optical isolator 19 with the optical isolator 20. After leaving the optical isolator 20 the light traveling in the optical path c is rotated by the half wave plate 18 inserted into the optical path c such that the plane of polarization thereof is turned by 90 degrees, whereby it finally becomes an extraordinary ray. Since the light traveling in the optical path d is an ordinary ray, the two rays are combined by the second birefringent plate 16 with each other.

On the other hand, the reverse reflection return light is interrupted by the polarization-dependent optical isolator 19 and the polarization-dependent optical isolator 20. Accordingly, the polarization-independent optical isolator of FIG. 9 can conceivably attain high isolation with the two polarization-dependent optical isolators. Also, the two rays separated by the birefringent plate have the same optical path length, so that the polarization dispersion is presumably little.

The polarization-independent optical isolator proposed by Shiraishi et al. as shown in FIG. 9, however, needs to use two birefringent plates, two half wave plates, and two polarization-dependent optical isolators (as shown in FIG. 1) composed of two polarizers, a Faraday rotator, and a permanent magnet. It is clear that the optical isolator of Shiraishi et al. is economically disadvantageous as compared with the conventional polarization-independent optical isolators, because it uses more components.

Imaizumi et al. proposed an optical isolator as shown in FIG. 10 in which two birefringent plates are provided for separating or combining light components whose polarization planes are perpendicular to each other, two Faraday rotators having a rotation angle of about 45 degrees are disposed between the two birefringent plates and between permanent magnets, and two polarizing elements are set in parallel between the Faraday rotators such that the polarized light interrupting direction of one polarizing element makes a 90 degree angle with that of the other polarizing element while a border between the two polarizing elements is positioned on the center of separation of two optical paths by the birefringent plates (Japanese Laid-open (Kokai) Patent Application No. 4-77713). In FIG. 10, numerals 21, 22 denote birefringent plates made of the rutile single crystal. Numerals 23, 24 represent Faraday rotators made of bismuth-substituted magnetic garnet. Numerals 25, 26 are thin film polarizing elements made of Polacore of Corning Co., Inc. Numerals 27, 28 designate permanent magnets made of Sm-Co, which are located such that they have the same direction of magnetization.

In FIG. 10 a ray a emitted from the semiconductor laser source enters the first birefringent plate 21, in which the ray a is separated into two rays having planes of vibration perpendicular to each other. Thus separated rays leave the first birefringent plate 21. The two rays leaving the first birefringent plate 21 propagate in parallel with each other and then enter the first Faraday rotator 23. The respective rays entering the first Faraday rotator 23 are rotated thereby such that each plane of polarization is rotated right by 45 degrees. The rays leaving the first Faraday rotator 23 then enter the polarizer 25 and the polarizer 26, respectively. Each of the polarizer 25, 26 is so arranged that the polarization plane of forward incident light is coincident with the transmission direction of the polarizers. Thus, the rays pass through the polarizers then to enter the second Faraday rotator 24. The respective rays entering the second Faraday rotator 24 are rotated such that the polarization planes thereof are rotated right by 45 degrees, and then leave the second Faraday rotator 24. The rays leaving the second Faraday rotator 24 then enter the second birefringent plate 22, where they are combined with each other.

On the other hand, reflected light b incident in the reverse direction is separated by the second birefringent plate 22 into two rays, and the two rays pass through the second birefringent plate 22 then to enter the second Faraday rotator 24. The reflected light b entering the second Faraday rotator 24 is rotated thereby such that the polarization plane thereof is rotated by 45 degrees in the same direction as that of forward light or ray a. The two rays leaving the second Faraday rotator 24 have the plane of polarization at 90 degrees to the polarization plane of forward ray. The reverse rays are interrupted by the polarizer 25 and the polarizer 26 accordingly.

In case the Faraday rotation angle of the Faraday rotator 24 is deviated from the 45 degrees of standard value, there appears light passing through the polarizers 25, 26. As described in detail about the return light in the polarization-independent optical isolator of FIG. 6, most of return light, which can pass through the polarizers 25, 26, leaves the first birefringent plate 21 at locations different from the incidence position of forward light. It is thus presumed that the polarization-independent optical isolator as so arranged shows high isolation comparative to those by the polarization-independent optical isolators as shown in FIG. 6 and in FIG. 8. Also, the polarization dispersion is presumably little.

However, in order to put the proposal of Imaizumi et al. as shown in FIG. 10 into practice, a very difficult assembling operation is required to set the two polarizers in parallel and to set their polarization directions inclined at 90 degrees to each other. Further, the position of the border between the two polarizers must be precisely and exactly coincident with the center of separation of two separate optical paths, and it is, therefore, readily conceivable that the setting and adjustment of optical paths are extremely difficult.

As described, such an extremely precise and difficult assembling operation must be carried out to produce the polarization-independent optical isolator proposed by Imaizumi et al. As seen from the contents of operation, this assembling operation requires judgement of conformity, which no industrial assembling robots currently available can deal with. In other words, it is substantially impossible to make the assembling operation automatic and unmanned. Therefore, the polarization-independent optical isolator proposed by Imaizumi et al. has a remaining problem that it cannot be produced in mass production nor provided at low price.

SUMMARY OF THE INVENTION

As described, the conventional polarization-independent optical isolators have serious problems, such as polarization dispersion which could negatively affect high speed optical communications, the increased number of components, and the difficulties of assembling and adjustment causing economic disadvantage.

The inventors have extensively and intensively studied to develop a polarization-independent optical isolator which has high isolation, is easy to assemble and adjust as well as to manipulate, and which is composed of less components, and finally achieved the present invention. It is, therefore, an object of the present invention to provide a high quality optical isolator with high isolation which can be made in mass production of industrial scale and in low cost of production, thereby making a contribution to putting the optical communications into practical use and to popularization thereof.

The inventors have intensively and extensively studied to solve the various technical problems as described above, and found that a polarization-independent optical isolator could be obtained with less polarization dispersion, with high performance, but very easy in assembling operation by such an arrangement that there are provided two birefringent plates for spatially separating or combining optical paths of light components whose polarization planes are perpendicular to each other, two Faraday rotators with rotation angle of about 45 degrees disposed between the two birefringent plates, and a polarizer disposed between the Faraday rotators, and that an external magnetic field is applied to make the two optical path regions of the Faraday rotators magnetized in the opposite directions to each other. The inventors further studied to improve the optical isolator and finally completed the present invention.

FIG. 11 schematically shows the construction of an optical isolator according to the present invention. Reference numerals 29, 30 denote birefringent plates made for example of a futile single crystal. Numerals 31, 32 designate Faraday rotators made for example of bismuth-substituted rare earth magnetic garnet. Numeral 33 represents a thin film polarizer made for example of Polacore of Corning. Numerals 34, 35, 36, 37 denote permanent magnets made for example of Sm-Co.

In FIG. 11, a ray a emitted from the semiconductor laser source is incident into the first birefringent plate 29, where the ray a is separated into two rays having planes of vibration perpendicular to each other, that is, into an ordinary ray and an extraordinary ray. The thus separated rays pass through the first birefringent plate 29. The two rays leaving the first birefringent plate 29 propagate in parallel with each other then to enter the first Faraday rotator 31. The ordinary ray entering the first Faraday rotator 31 is rotated thereby such that the plane of polarization thereof is rotated left by 45 degrees, while the extraordinary ray is rotated such that the plane of polarization thereof is turned right by 45 degrees. Consequently, the two rays leaving the first Faraday rotator 31 have planes of polarization coincident with each other. The polarizer 33 is set such that the polarized light transmission direction thereof is coincident with the planes of polarization of the two rays. The two rays leaving the first Faraday rotator 31 can pass through the polarizer 33 accordingly, and then enter the second Faraday rotator 32. The ordinary ray entering the second Faraday rotator 32 is rotated thereby such that the plane of polarization thereof is rotated left by 45 degrees so as to become an extraordinary ray. The extraordinary ray entering the second Faraday rotator 32 is rotated thereby such that the plane of polarization thereof is rotated right by 45 degrees so as to become an ordinary ray. Thus, the two rays are combined with each other by the second birefringent plate 30.

On the other hand, reflected light b incident in the reverse direction is separated by the second birefringent plate 30 into two rays, and the two rays pass through the second birefringent plate 30 then to enter the second Faraday rotator 32. The reflected light b entering the second Faraday rotator 32 is rotated thereby such that planes of polarization of two rays are rotated by 45 degrees in the same direction as that of forward light or ray a. The two rays leaving the second Faraday rotator 32 have the planes of polarization thereof coincident with the interruption direction of the polarizer 33, so that they are interrupted by the polarizer 33. In case that the Faraday rotation angle of the Faraday rotator 32 is deviated from 45°, there could appear light passing through the polarizer 33. As described in detail about the return light in the polarization-independent optical isolator of FIG. 6, most of light passing through the polarizer 33 leaves the first birefringent plate 29 at locations different from the incident position of forward light.

The polarization-independent optical isolator of the present invention has excellent features of very high isolation and less polarization dispersion. Further, the optical isolator of the present invention has a property and effect such that the isolation is rarely affected by variations of environmental temperature or of wavelength because of the structure thereof. It is not too much to say that such a property and effect is a surprising technical improvement or progress in the field of art, which would make a great contribution to putting the optical communications into practical use and to the popularization thereof.

In application of the present invention the birefringent plates do not have to be special, but may be selected from those commercially available as a normal birefringent plate suitable for the purpose. Considering the quality and the easiness of availability, a suitable material for birefringent plate is calcite or a futile single crystal.

In application of the present invention, the polarizing elements disposed between the Faraday rotators do not have to be special, but may be selected from those normally commercially available and suitable for the purpose. Specifically, the dichroic polarizer is preferable in terms of performance.

In application of the present invention, the Faraday rotators do not have to be special, but may be selected from those normally commercially available and suitable for the purpose. Considering the quality and the easiness of availability, a preferable material for Faraday rotator is bismuth-substituted magnetic garnet single crystal. Specifically, the bismuth-substituted magnetic garnet preferably has a large Faraday rotation factor and a low saturation magnetic field.

In application of the present invention, the quality of Faraday rotating elements, that is, the Faraday rotation angle, is preferably set within a range of 45±5 degrees, and more preferably within a range of 45±3 degrees. If a Faraday rotating element has a deviation of more than 5 degrees of Faraday rotation angle, an insertion loss of forward ray becomes excessive, which is not preferable.

In application of the present invention, there are several combinations available in arrangement of magnets and Faraday rotators. FIG. 12 shows a specific example among the combinations. In FIG. 12, numerals 34, 35, 36, 37 are permanent magnets made for example of Sm-Co. Numerals 31, 32 denote Faraday rotators made for example of the bismuth-substituted magnetic garnet single crystal. Numeral 33 designates a polarizer made for example of Polacore of Corning. The magnet 34 and the magnet 35 magnetize to saturate the upper portions of the Faraday rotator 31 and the Faraday rotator 32 such that the direction of magnetization thereof is directed to the right in FIG. 12. On the other hand, the magnet 36 and the magnet 37 magnetize to saturate the lower portions of the Faraday rotator 31 and the Faraday rotator 32 such that the direction of magnetization thereof is directed to the left in FIG. 12.

Although the optical isolator of the present invention is basically polarization-independent, it can be applied as polarization-dependent if desired.

The present invention will be described in detail with embodiments to show specific applications. It should be noted that the following examples are for specifically describing the invention, but that it is not intended to limit applications and modifications of the present invention, or the scope of the invention.

DESCRIPTION OF THE PREFERRED EMBODIMENTS

EXAMPLE 1

First put into a platinum crucible of volume 4000 ml were 6.30 kg of lead oxide (PbO, 4N), 7.50 kg of bismuth oxide ($Bi_2O_3$, 4N), 830 g of ion oxide ($Fe_2O_3$, 4N), 280 g of boron oxide ($B_2O_3$, 5N), 90 g of gadolinium oxide ($Gd_2O_3$, 3N), 16.3 g of gallium oxide ($Ga_2O_3$, 3N), and 44 g of aluminum oxide ($Al_2O_3$, 3N). The platinum crucible was set at a predetermined position in precision vertical tubular electric furnace, and was heated at 1000° C. to melt the mixture. The melt mixture was fully stirred to be evenly mixed, and then cooled down to the melt temperature of 800° C. to obtain a melt for raising a bismuth-substituted magnetic garnet single crystal. By conventional procedure, the surface of thus obtained melt was made in contact with a surface of (111) garnet single crystal substrate, $(GdCa)_3(GaMgZr)_5O_{12}$, (lattice constant: 12.497±0.002 Å) in thickness of 480 μm and in size of 2 inches, and the epitaxial growth was continued for 22 hours while maintaining the melt temperature of 800° C. The epitaxial growth provided a (GdBi)$_3$(FeGaAl)$_5$O$_{12}$ single crystal film in film thickness of 420 μm. The surface of thus obtained single crystal film was abraded by conventional procedure to obtain an abraded film in film thickness of 331 μm. The abraded film was then cut by conventional procedure into a predetermined size of 2 mm ×2 mm to obtain two cut films, and the cut films were provided with anti-reflection film with center wavelength at wavelength 1.31 μm to obtain Faraday rotators (numerals 31, 32 in FIG. 14) with Faraday rotation angle of 45.7 degrees for light of wavelength 1.31 μm.

Figure 1:
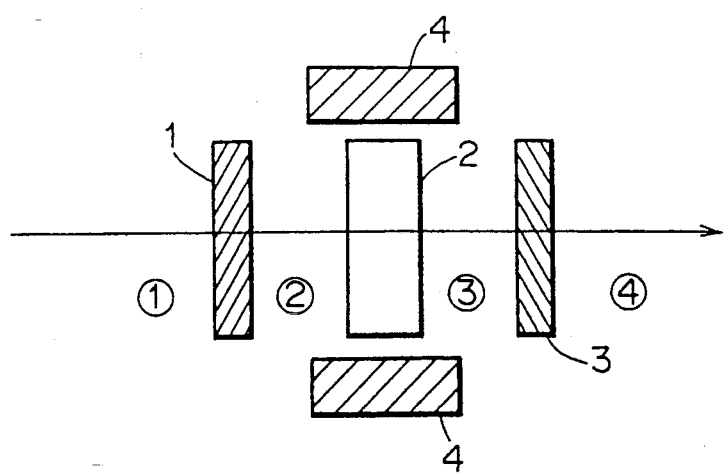
FIG. 1 is a schematic drawing to show a basic construction of a polarization-dependent optical isolator which interrupts reflection return light to semiconductor laser.
Figure 2:
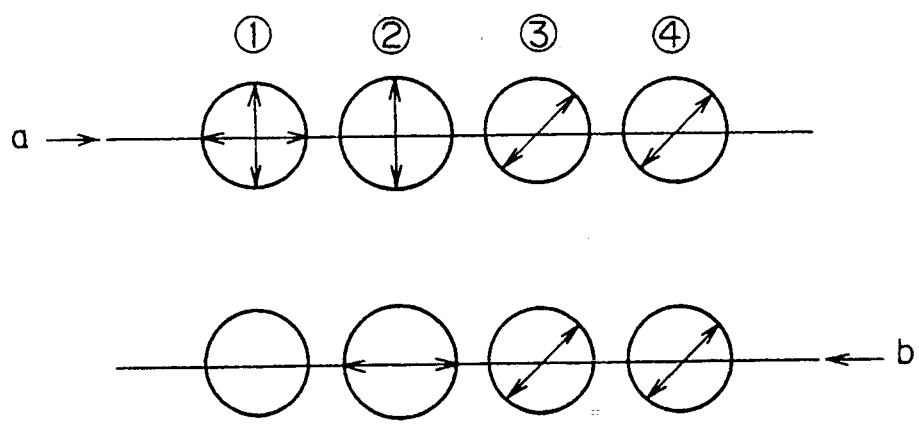
FIG. 2 is a schematic drawing to illustrate polarization directions of forward light and reverse light in the polarization-dependent optical isolator which interrupts reflection return light to semiconductor laser.
Figure 3:
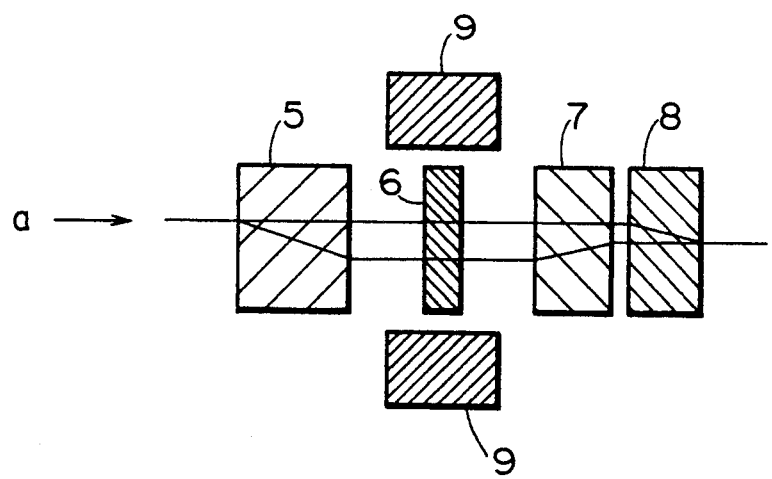
FIG. 3 is a schematic drawing to show the basic construction of a polarization-independent optical isolator as disclosed in Japanese Patent Publication (Kokoku) No. 60-51690, and optical paths of forward light.
Figure 4:
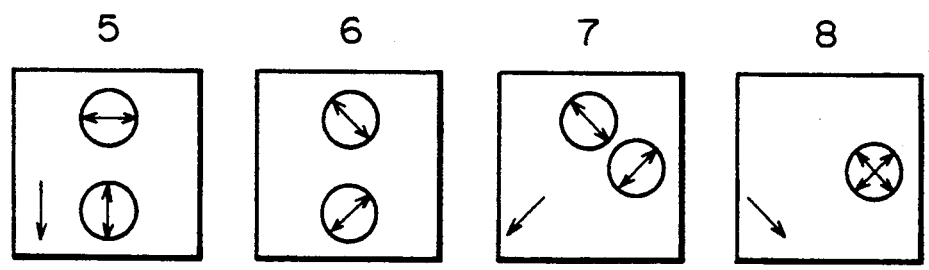
FIG. 4 is a schematic drawing to show output positions and polarization directions of forward light on each surface of elements in the polarization-independent optical isolator as disclosed in Japanese Patent Publication (Kokoku) No. 60-51690.
Figure 5:
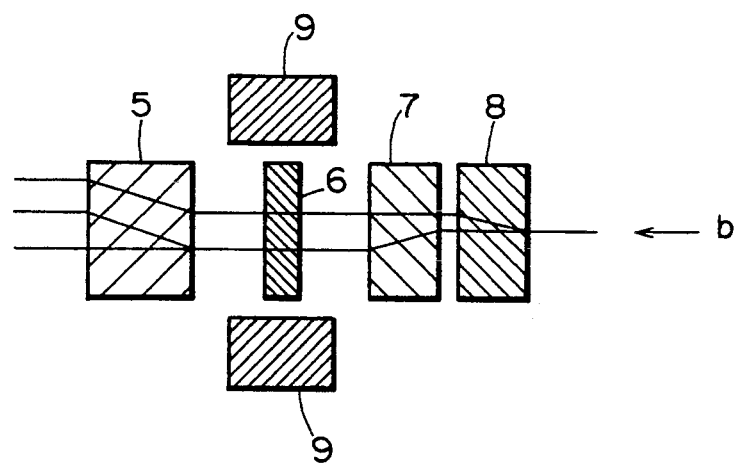
FIG. 5 is a schematic drawing to show the basic construction of the polarization-independent optical isolator as disclosed in Japanese Patent Publication (Kokoku) No. 60-51690, and optical paths of reverse light.
Figure 6:
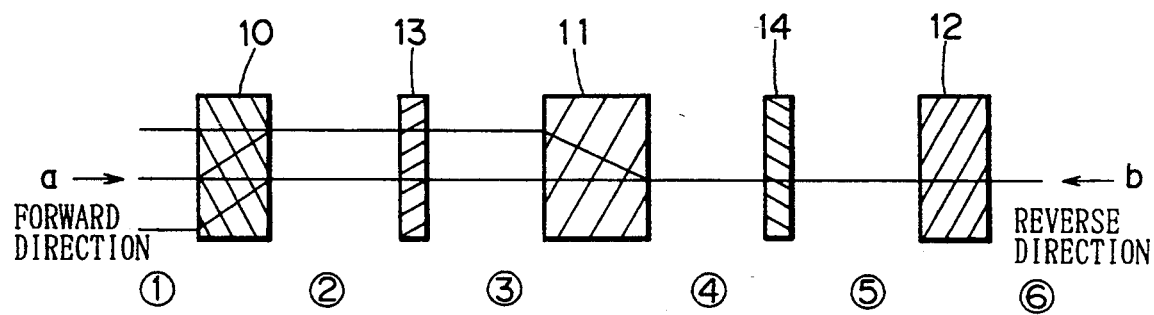
FIG. 6 is a schematic drawing to show the basic construction of a polarization-independent optical isolator as disclosed in European Patent No. 0352002, and optical paths therein.
Figure 7:
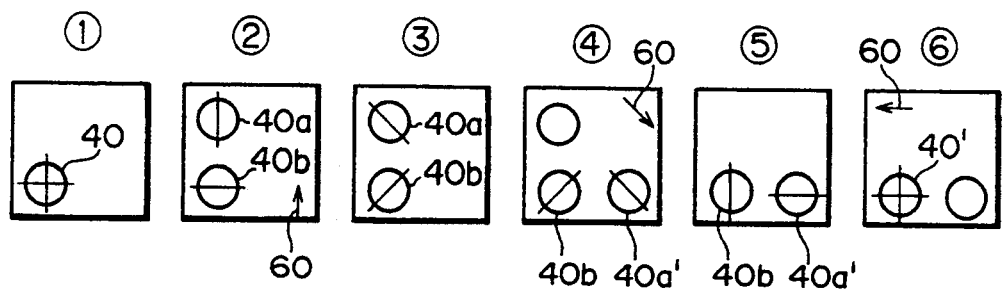
FIG. 7 is a schematic drawing to show output positions and polarization directions of forward light on each surface of elements in the polarization-independent optical isolator as disclosed in European Patent No. 0352002.
Figure 8:
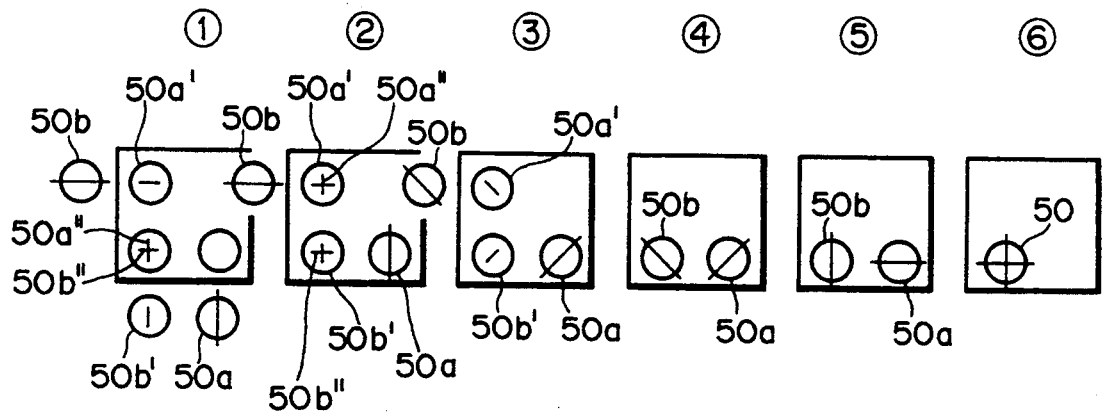
FIG. 8 is a schematic drawing to show output positions and polarization directions of reverse light on each surface of elements in the polarization-independent optical isolator as disclosed in European Patent No. 0352002.
Figure 9:
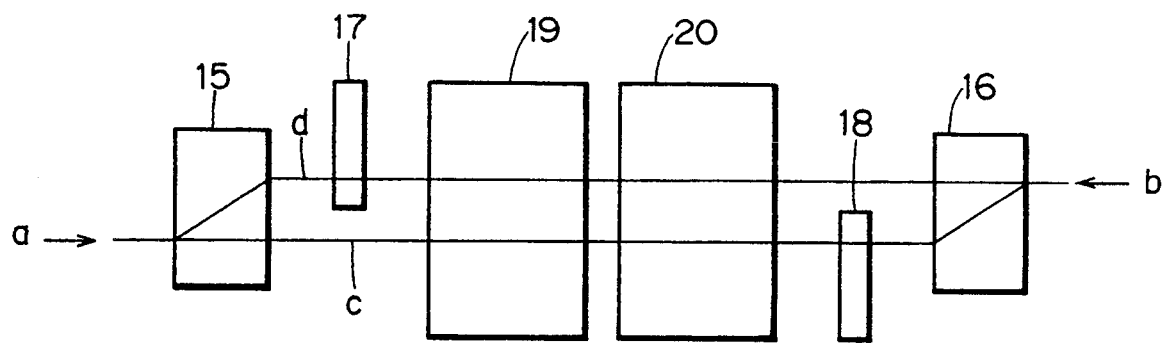
FIG. 9 is a schematic drawing to show the basic construction of a polarization-independent optical isolator as presented at '91 Spring National Conference c-290, Institute of Electronics, Information and Communication Engineers of Japan, and optical paths therein.
Figure 14:
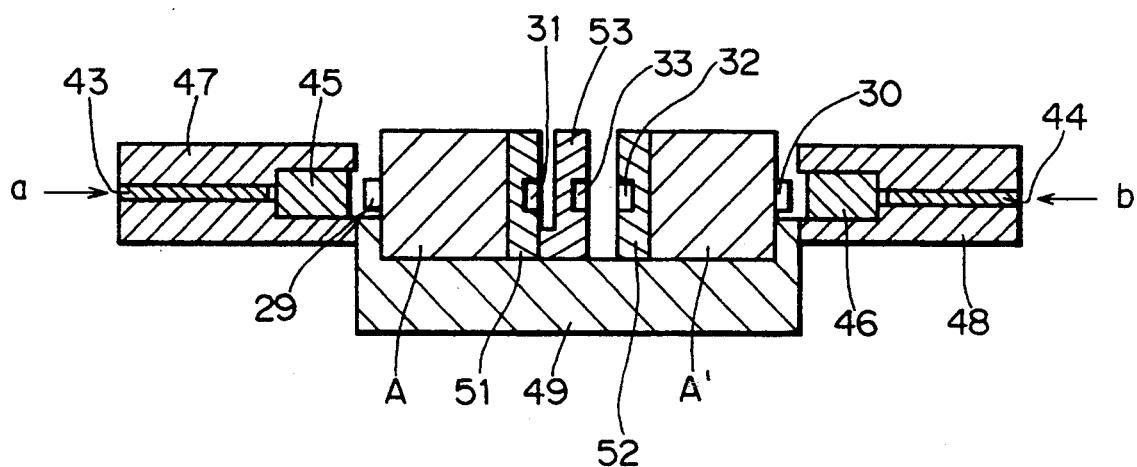
FIG. 14 is a conceptual drawing to schematically show an example of application in cross section (construction and arrangement) of the polarization-independent optical isolator of the present invention.
Figure 10:
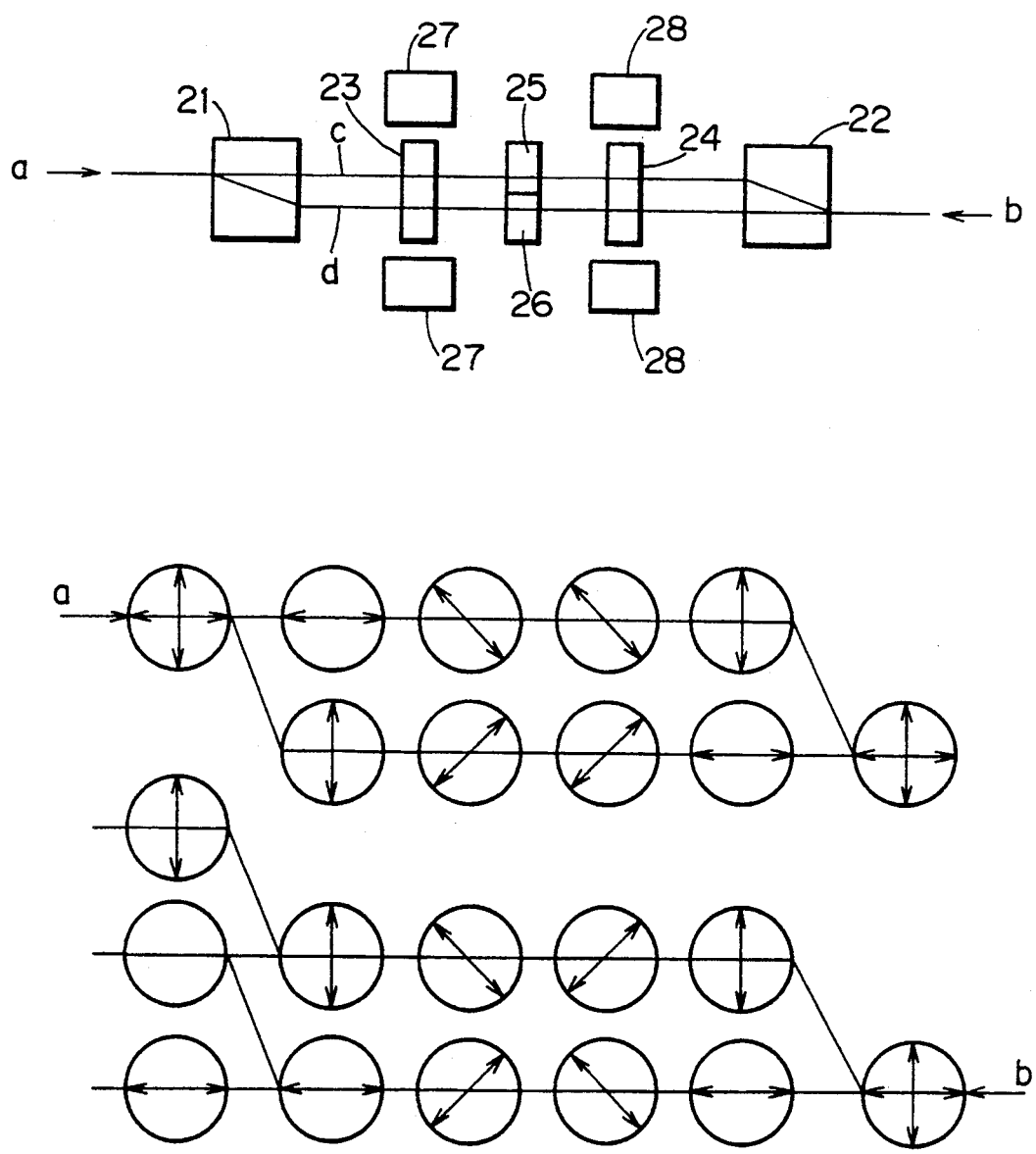
FIG. 10 is a schematic drawing to show the basic construction of a polarization-independent optical isolator as disclosed in Japanese Laid-open (Kokai) Patent Application No. 4-77713, and optical paths and polarization directions of forward light and reverse light.
Figure 11:
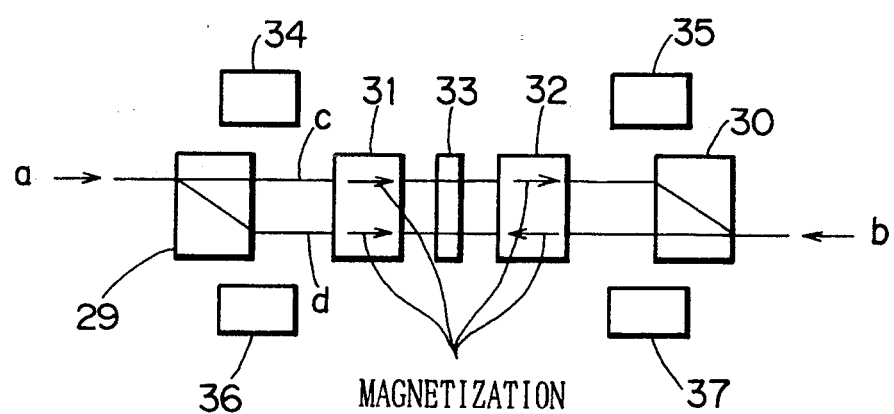
FIG. 11 is a schematic drawing to show the basic construction of a polarization-independent optical isolator according to the present invention with optical paths and polarization directions of forward light and reverse light.
Figure 11:
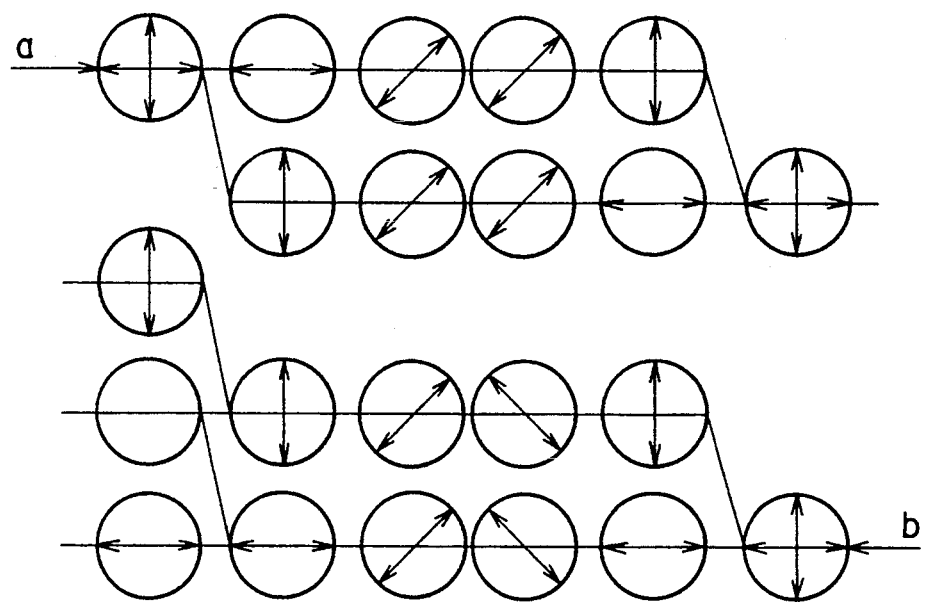
Figure 12:
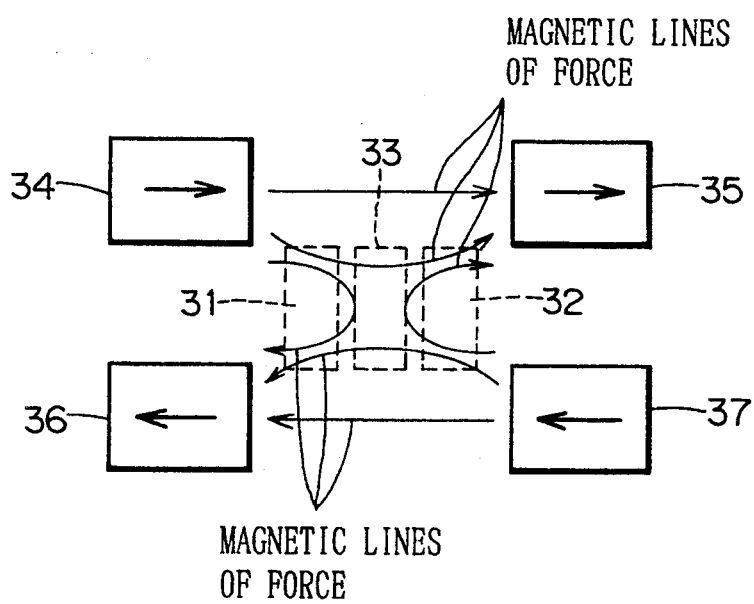
FIG. 12 is a schematic drawing to illustrate as a specific example locations of magnets and a state of magnetic lines of force in Faraday elements in the polarization-independent optical isolator of the present invention.

The thus obtained Faraday rotators 31, 32 were set in metal jigs 51, 52, respectively, and fixed therein with adhesive to obtain Faraday rotator blocks as shown in FIG. 14. Similarly, a polarizer 33 (trade name: Polacore manufactured by Corning Co., Inc.), on which the anti-reflection film with the center wavelength at wavelength 1.31 μm was applied, was set in a metal jig 53 and fixed therein to obtain a polarizer block as shown in FIG. 14.

Figure 13:
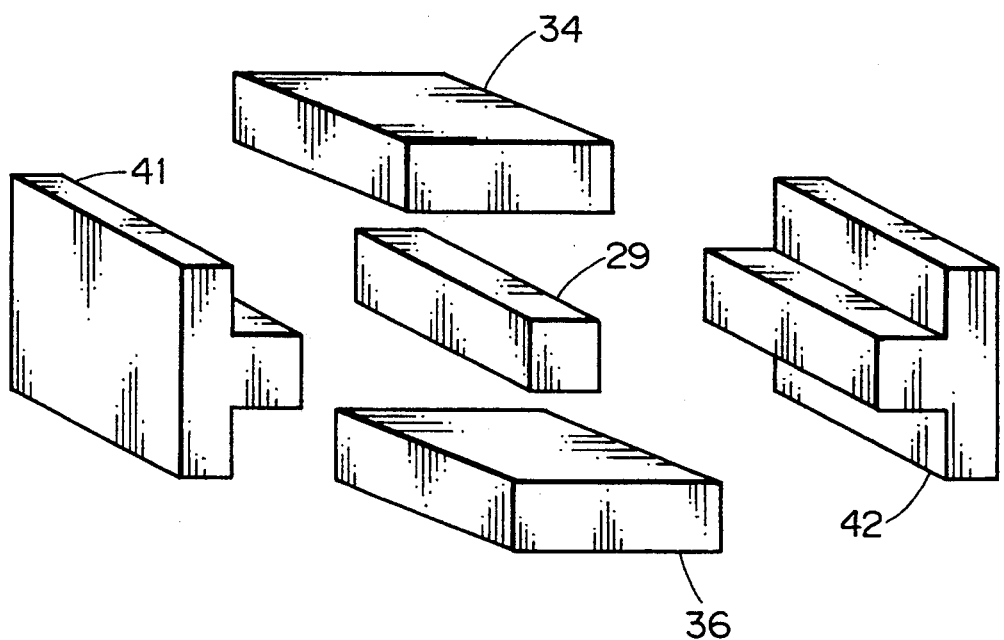
FIG. 13 is a schematic drawing to illustrate an operation and steps for setting permanent magnets and a birefringent plate between metal spacers into an assembly in an application of the polarization-independent optical isolator of the present invention.

Mounted on a permanent magnet 36 (Sm-Co magnet trade name REC-21 in size of 2 mm×4 mm×6 mm manufactured by TDK CORP.) was a birefringent plate 29 (in size of 2 mm×2 mm×7.5 mm manufactured by Chichibu Cement Co., Ltd.) made of a rutile single crystal on which the anti-reflection film with the center wavelength at wavelength 1.31 μm was applied. A metal spacer 41 and a metal spacer 42 were then attached to them. Finally, a permanent magnet 34 (Sm-Co magnet, trade name REC-21 in a size of 2 mm×4 mm×6 mm manufactured by TDK CORP.) was mounted on them and fixed with adhesive to obtain a birefringent-magnet block (reference character A) as shown in FIG. 13. Another birefringent plate-magnet block (reference character A') was obtained in the same manner (see FIG. 13 and FIG. 14).

The thus obtained Faraday rotator blocks (51, 52), the polarizer block (53), and the birefringent plate-magnet blocks (letter A, letter A') were mounted on a metal base 49 and fixed with adhesive to obtain an optical isolator block.

An optical fiber block was obtained by setting at a predetermined position in a cylindrical metal jig 47 a distributed refractive index lens 45 (trade name: Selfoc microlens manufactured by Nippon Sheet Glass, Ltd. (Nippon Itagarasu)) on which the anti-reflection film with the center wavelength at wavelength 1.31 μm was applied, and a single-mode optical fiber 43 of core diameter of 10 μm. Another optical fiber block was similarly obtained by setting a distributed refractive index lens 46 and a single-mode optical fiber 44 at a predetermined position in a cylindrical metal jig 48.

The thus obtained optical fiber blocks were attached to the optical isolator block at predetermined positions to obtain a polarization-independent optical isolator. The interplanar distance between the distributed refractive index lens 45 and the distributed refractive index lens 46 was approximately 20.2 mm.

A semiconductor laser source (trade name: wideband wavelength variable LD light source, TSL-80 model manufactured by Santech) is connected to the optical fiber 43 in the thus obtained polarization-independent optical isolator, and a photo detector (trade name: Powermeter, ML9001A model manufactured by ANRITSU CORP.) was connected to the optical fiber 44 (in isothermic room at ambient temperature (room temperature) of 25° C.). The semiconductor laser source was made to emit a laser beam of wavelength 1.31 μm, and the locations of the metal jig 47 and the metal jig 48 were finely adjusted with care to obtain the maximum light intensity received by the light power meter.

The polarization-independent optical isolator thus obtained and adjusted had an optical loss of 1.5 dB in the forward direction (in the a direction) and an optical loss of 56.2 dB in the reverse direction (in the b direction). Therefore, the polarization-independent optical isolator thus obtained and adjusted had an isolation of 54.7 dB.

Next, the measurement wavelength was changed between 1280 nm and 1340 nm at the fixed measurement temperature of 25° C., and it was observed that the isolation was kept over 50 dB.

Also, the ambient temperature was changed between 0° C. and 50° C. at the fixed measurement wavelength of 1310 nm, and it was found that the isolation was kept over 50 dB.

EXAMPLE 2

A polarization-independent optical isolator was obtained and adjusted in the same process and operation as those in Example 1 except that a Faraday rotator with Faraday rotation angle of 43.2 degrees and another with Faraday rotation angle of 46.5 degrees for light of wavelength 1.31 μm were used in place of the Faraday rotators with Faraday rotation angle of 45.7 degrees for light with wavelength 1.31 μm in Example 1.

The polarization-independent optical isolator thus obtained and adjusted had an optical loss (insertion loss) of 1.7 dB in the forward direction and an isolation of 53.6 dB.

EXAMPLE 3

A polarization-independent optical isolator was obtained and adjusted in the same process and operation as those in Example 1 except that the epitaxial growth was continued for 28 hours, instead of that for 22 hours in Example 1, to obtain a (GdBi)$_3$(FeGaAl)$_5$O$_{12}$ single crystal film in film thickness of 530 μm, from which Faraday rotators with Faraday rotation angle of 44.0 degrees for light of wavelength 1.55 μm were attained.

The polarization-independent optical isolator thus obtained and adjusted had an optical loss (insertion loss) of 1.4 dB in the forward direction and an isolation of 53.0 dB.

According to the present invention as described, the optical isolator requires little fine adjustment, which was essential in the conventional polarization-independent optical isolators, and can achieve the performance of 50 dB or more required for optical isolator with less components. Also, the optical isolator of the present invention has little difference in length between two optical paths in the optical isolator, so that it may minimize the polarization dispersion, which could negatively affect the high speed optical communications.

What is claimed is:

1. An optical isolator comprising:
   first and second birefringent plates,
   one of the first and second birefringent plates separating two light components whose planes of polarization are perpendicular to each other to make the two light components spatially separate between separate optical paths, and
   another of the first and second birefringent plates thereafter combining the two separate light components;

a polarizer disposed between the first and second birefringent plates and having a predetermined polarized-light transmitting angle;

a first Faraday rotator disposed between the first birefringent plate and the polarizer and having a first Faraday rotation angle of approximately 45 degrees, the first Faraday rotator functioning in a forward direction so that it rotates respective polarization planes of the two light components emitted from the first birefringent plate by approximately 45 degrees in directions opposite to each other so as to cause the polarization planes of the two light components emitted from the first birefringent plate to be parallel to the predetermined polarized-light transmitting angle of the polarizer, wherein the two light components emitted from the first birefringent plate may pass through the polarizer;

a second Faraday rotator disposed between the second birefringent plate and the polarizer and having a second Faraday rotation angle of approximately 45 degrees, the second Faraday rotator functioning in a reverse direction so that it rotates respective polarization planes of the two light components emitted from the second birefringent plate by approximately 45 degrees in directions opposite to each other so as to cause the polarization planes of the two light components emitted from the second birefringent plate to be perpendicular to the predetermined polarized-light transmitting angle of the polarizer, wherein the two light components emitted from the second birefringent plate do not pass through the polarizer; and magnetic field means for applying an external magnetic field to the two separate optical paths in the two Faraday rotators to magnetize respective regions near the two optical paths in each of the Faraday rotators in opposite magnetization directions to each other.

2. An optical isolator according to claim 1, wherein said birefringent plates are made of calcite or a futile single crystal.

3. An optical isolator according to claim 1, wherein said Faraday rotators are made of a bismuth-substituted magnetic garnet single crystal.

4. An optical isolator according to claim 1, wherein said polarizer is a dichroic polarizer.

5. An optical isolator according to claim 1, wherein said magnetic field means comprises four permanent magnets.

6. An optical isolator according to claim 1, wherein said two light components are an ordinary ray and an extraordinary ray.

* * * * *